Figure 1:
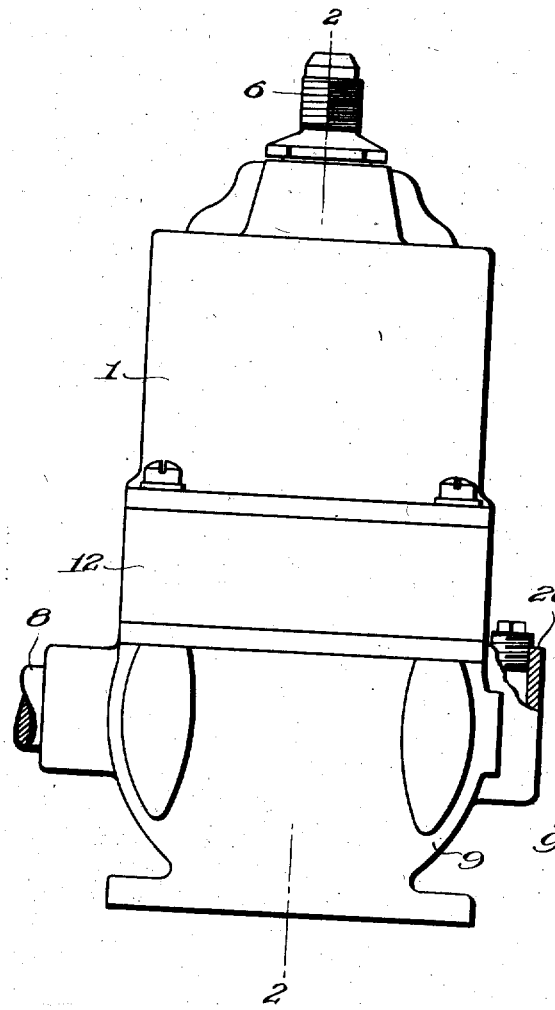

May 6, 1924.

F. G. TEFFT

Re. 15,833

PUMP

Original Filed Aug. 30, 1918

Inventor.
Floyd G. Tefft,
By Heard Smith Hunnicutt
Atty's.

Reissued May 6, 1924. Re. 15,833

UNITED STATES PATENT OFFICE.

FLOYD G. TEFFT, OF TROY, NEW YORK, ASSIGNOR, BY MESNE ASSIGNMENTS, TO TROY FOUNDRY AND MACHINE CO., INC., OF TROY, NEW YORK, A CORPORATION OF MASSACHUSETTS.

PUMP.

Original No. 1,320,942, dated November 4, 1919, Serial No. 525,013, filed August 30, 1918. Application for reissue filed January 22, 1920. Serial No. 353,333.

*To all whom it may concern:*

Be it known that I, FLOYD G. TEFFT, a citizen of the United States, residing at Troy, county of Rensselaer, State of New York, have invented an Improvement in Pumps, of which the following description, in connection with the accompanying drawing is a specification, like characters on the drawing representing like parts.

This invention relates to pumps and particularly to pumps such as are used for pumping up the tires of automobiles. The objects of the invention are to provide an improved pump having novel means for preventing an excess of oil from working past the piston; to provide a novel arrangement by which the piston is guided in its movement, and otherwise to improve pumps of this nature all as will be more fully hereinafter described.

In order to give an understanding of my invention, I have illustrated in the drawings a selected embodiment thereof which will now be described, after which the novel features will be pointed out in the appended claims.

Figure 2:
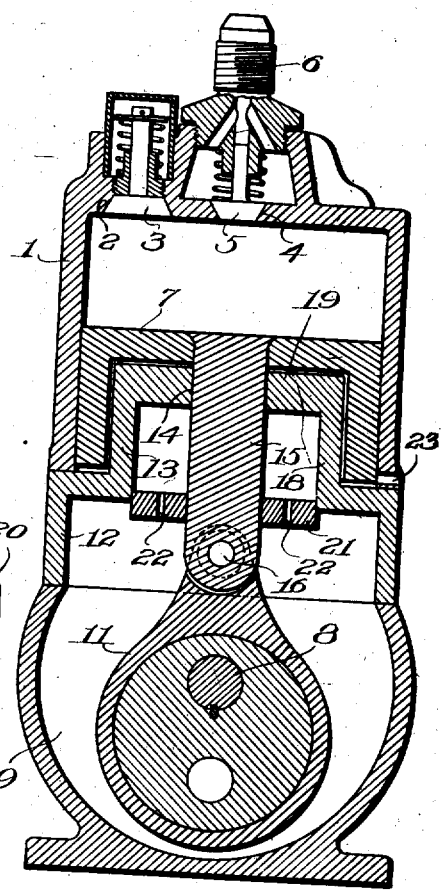

In the drawings, Fig. 1 is a side view of a pump embodying my invention;

Fig. 2 is a section on the line 2—2, Fig. 1.

The pump comprises a cylinder 1 in which operates a piston 7 and which has an air inlet port 2 which is controlled by an inwardly-opening spring-pressed inlet valve 3, and also a discharge port 4 controlled by an outwardly-opening spring-pressed valve 5. The outlet port 4 communicates with a nipple 6 to which a pipe may be attached.

The piston 7 is actuated from a driving shaft 8 which extends into the crank casing or eccentric casing 9 and which has fast thereon an eccentric 10 that is embraced by an eccentric strap 11, said eccentric strap being connected to the piston.

The parts thus far described are or may be all as usual in pumps of this nature.

In order that a pump of this type may operate properly, it is essential that the piston should be kept lubricated, but it is also highly important that no oil or other lubricant should work past the piston because the presence of oil in the air which is pumped into an automobile tire is detrimental to the tire.

In my present invention I provide a novel construction which not only prevents the oil from working by the piston, but also constitutes means for guiding the piston so as to prevent any tendency for the latter to rock or twist in the cylinder.

Situated between the cylinder 1 and the crank casing 9 is an intermediate member 12 which has integral therewith a partition or division wall 13 that extends across the cylinder, said partition or separating wall having a central opening 14 therein in which operates a piston rod 15 which is rigid with the piston and pivotally connected with the lower end of the eccentric strap as shown at 16.

The intermediate member 12 forms a continuation of the walls of the crank case chamber 9, and the partition 13 is shaped to present the annular horizontal portion 17, the vertical portion 18 and the upper horizontal portion 19 that is provided with the aperture 14. The piston 7 is cup-shaped and the partition 13 is so shaped that when the piston is at the lower end of its stroke the vertical flange or cylindrical wall thereof occupies the space between the vertical portion 18 of the partition and the wall of the cylinder.

The crank casing is provided with an opening 20 through which oil or other lubricating materials may be introduced, said oil operating to lubricate the driving shaft 8 and the eccentric strap 11.

The partition 13 acts as an oil guard or oil deflector and prevents the oil from being thrown directly against the walls of the cylinder by the rotating motion of the eccentric.

21 is a collar fast on the piston rod 15 and of a size to fit the interior of the vertical portion 18 of the partition 13. This collar 21 is provided with one or more apertures 22 through which the oil will seep. This collar 21 assists in holding the piston rod in a true vertical postion and prevents any rocking or cramping of the piston as it reciprocates. In the operation of the device a sufficient quantity of oil will work through the apertures 22 to lubricate the contacting surface of the collar 21 and the vertical portion 18 of the partition.

The amount of oil which thus works through the apertures 22 will also be sufficient to lubricate the contacting surface between the piston rod 15 and the wall of the aperture 14 and sufficient oil will work through the aperture 14 to give proper lubrication to the piston.

While the amount of oil which is delivered to the cylinder walls is sufficient to properly lubricate the piston it is so small that no excess oil can work past the piston and accumulate in the compression end of the cylinder.

23 indicates a breather aperture in the cylinder to relieve compression between the piston and the partition 13 on the down stroke.

I claim:

1. In a pump, the combination with a pump casing having a cylinder and a crank chamber, of a cup-shaped piston operating in the cylinder and having a piston rod rigid therewith, a driving shaft journaled in the crank chamber and to which the piston rod is connected, and a member situated between the cylinder and the crank chamber and provided with an oil-deflecting partition extending across the cylinder, the central portion of the partition being raised and having a shape to fit within the piston when the latter is at the lower end of its stroke, said raised portion having an aperture through which the piston rod extends.

2. In a pump, the combination with a casing comprising a cylinder and a crank casing, of a piston operating in said cylinder, a piston rod rigid with the piston, a driving shaft journaled in the crank casing and connected to the piston rod, a partition extending across the cylinder beneath the piston and provided with a cylindrical portion and an opening through which the piston rod extends, and a collar fast to the piston rod and operating in said cylindrical portion, said partition acting as an oil deflector to prevent oil from being thrown against the walls of the cylinder and said collar co-operating with the partition to guide the piston rod and hold the latter in true alinement.

3. A tire pump comprising a cylinder, a crank casing adapted to contain lubricant, an operating shaft journalled in the crank casing and situated in the axial line of the cylinder, a piston in the cylinder having a piston rod, means connecting the piston rod to the operating shaft, and a partition member between the lower end of the cylinder and the top of the crank case, said member having a raised central portion provided with an opening through which the piston rod extends, said member constituting means to prevent oil from being thrown against the walls of the cylinder by the rotation of the operating shaft.

4. An improved automobile tire pump structure comprising an eccentric case containing a lubricant, a cylinder mounted thereon, an operating shaft journalled in the crank case and situated in the axial line of the cylinder, a piston in the cylinder having a piston rod, means connecting the piston rod to the operating shaft, and a separating wall between the lower end of the cylinder and the top of the eccentric case, said wall having a raised central portion provided with a bearing opening through which the piston rod extends and constituting means to prevent oil from being thrown against the walls of the cylinder by the rotation of the operating shaft.

5. In an automobile tire pump, the combination with an eccentric case containing a lubricant, of a cylinder mounted thereon, said cylinder having inlet and outlet valves in one end and a breather opening at the other end, a single stroke piston operating in the cylinder, a piston rod connected to the piston, means connecting the piston rod to the operating shaft, and a separating wall between the lower end of the cylinder and the top of the crank case, said wall having a bearing opening through which the piston rod extends and acting as a deflector to prevent the oil which is splashed by the shaft from being thrown against the wall of the cylinder.

In testimony whereof I have signed my name to this specification.

FLOYD G. TEFFT